United States Patent [19]
Siegel et al.

[11] 3,730,058
[45] May 1, 1973

[54] CYLINDER AND PISTON UNIT

[75] Inventors: Heinz Siegel, Bietigheim-Buch; August Kraisel, Bittenfeld, both of Germany

[73] Assignee: Robert Bosch G.m.b.H., Stuttgart, Germany

[22] Filed: May 11, 1971

[21] Appl. No.: 142,261

[30] Foreign Application Priority Data

July 11, 1970 Germany ................... G 70 26 240.7

[52] U.S. Cl. ............................. 92/128, 287/DIG. 5
[51] Int. Cl. .............................................. F01b 29/00
[58] Field of Search ...................... 92/128, 255, 29;
287/53 TK, DIG. 5, 52.08; 85/5 B

[56] References Cited

UNITED STATES PATENTS

| 2,470,179 | 5/1949 | McCloskey | 285/DIG. 5 |
| 2,611,464 | 9/1952 | Rabe | 192/93 C |
| 3,334,773 | 8/1967 | Bimba | 92/128 UX |
| 479,406 | 7/1892 | Dickerson et al | 287/DIG. 5 |
| 2,714,522 | 8/1955 | Becker | 92/128 UX |

Primary Examiner—Charles J. Myhre
Assistant Examiner—R. H. Lazarus
Attorney—Michael S. Striker

[57] ABSTRACT

A piston is guided for movement in a cylinder and has a piston rod which is coupled with the piston via a pair of juxtaposed grooves provided in the piston and in a portion of the piston rod to define between themselves an enclosed channel in which spherical retaining members are accommodated, with an opening being provided which communicates with this channel and permits the introduction and removal of the spherical members.

5 Claims, 1 Drawing Figure

Patented May 1, 1973  3,730,058
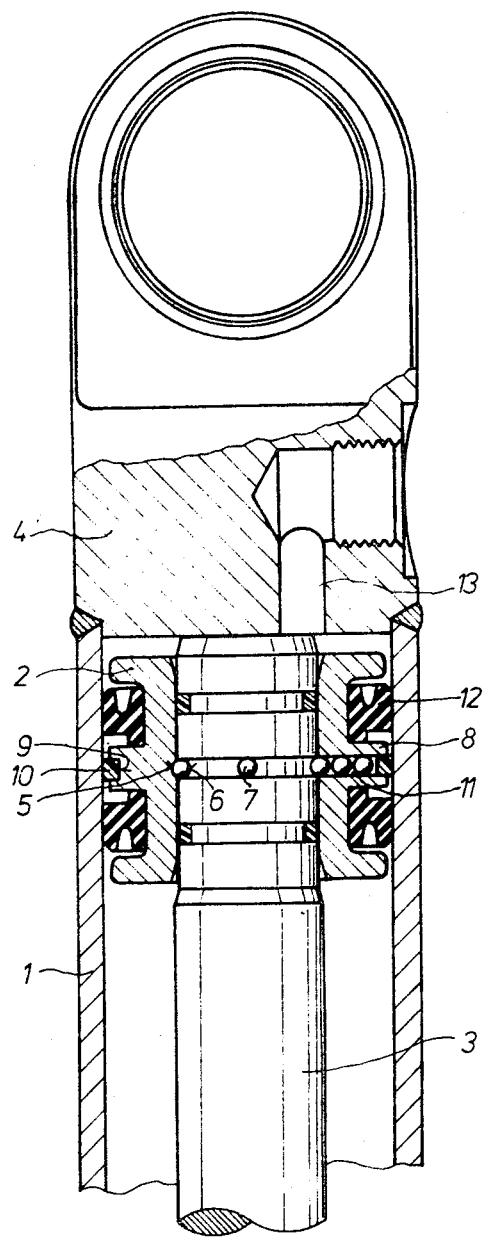
INVENTORS:
Heinz SIEGEL
August KRAISEL
BY
their Attorney 3,730,058

CYLINDER AND PISTON UNIT

BACKGROUND OF THE INVENTION

The present invention relates generally to a cylinder and piston unit and more particularly to a cylinder and piston unit having a releasable coupling between the piston and the piston rod thereof.

For various reasons, a detailed discussion of which is not necessary in the present context, it is frequently desirable to couple the piston rod of a piston in a cylinder and piston unit, releasably with the piston rather than making it non-removable. According to a construction known from the prior art this can be accomplished by having a bolt extend through a portion of the piston and a portion of the piston rod. However, this has been found to be disadvantageous because the bores which must necessarily be provided within the piston and in the piston rod for the passage of the bolt therethrough, evidently weaken the components involved in that they subtract from the cross-sectional areas in which bores must be formed, so that this connection becomes susceptible to breakage.

SUMMARY OF THE INVENTION

It is, accordingly, an object of the present invention to overcome the aforementioned disadvantages.

More particularly, it is an object of the present invention to provide an improved cylinder and piston unit in which the releasable connection between the piston and piston rod is not possessed of the aforementioned disadvantages of the prior art.

A concomitant object of the present invention is to provide such an improved unit which is suitable particularly for hydraulic and pneumatic applications, and which greatly increase the life of the components involved.

In pursuance of the above objects, and others which will become apparent hereafter, one feature of the invention resides in a cylinder and piston unit which, briefly stated, comprises a cylinder and piston which is accommodated in the cylinder for guided movement therein. A piston rod is also provided and coupling means releasably couples the piston rod with the piston. The coupling means according to the invention comprises at least one peripheral groove in the piston, at least one second peripheral in the piston rod open to the first groove and defining with the same a peripheral channel, and a plurality of spherical members accommodated in this channel and each partially projecting into the respective grooves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a somewhat simplified partially partial longitudinal section through a cylinder and piston unit according to the present invention.

DESCRIPTION OF THE PREFERRED EMBODIMENTS

Discussing the drawing now in detail, it is pointed out that reference numeral 1 identifies a cylinder in which a piston is slidably guided in usual manner, sealingly engaging the inner circumferential surface of the cylinder 1. The piston is provided with an axial bore so that it can be pushed onto the innermost end portion of a piston rod 3. A bottom wall 4 closes the cylinder 1 and is provided with a fluid channel communicating with the cylinder chamber.

According to the present invention the piston 2 is provided in its inner circumferential surface bounding its central axial bore with at least one peripheral groove 5 which is annular and of semi-circular cross-section. In the radial plane of the groove 5 the outer circumferential surface of the piston rod 3 is provided with a similar annular peripheral groove 6 which is also of semi-circular cross-section and which defines with the groove 5 a peripheral passage. In this passage there are accommodated several spherical members 7 which may be of steel or the like and which can be introduced and removed through a radial bore 11 provided in one of the flanges 8 of the piston 2. The flange 8 in which the bore 11 is provided is also provided with an outer circumferential recess 9 of annular configuration in which there is accommodated an axially slotted springy piston ring 10 of synthetic plastic material which thus not only provides a sealing action with reference to the inner surface of the cylinder 1, but also covers the radial bore 11. Sealing rings 12 of rubber or similar elastomeric material are located at both opposite axial sides of the flange 8 provided with the ring 10.

To connect the piston od 3 with the piston 2 in releasable manner, it is simply necessary to remove the piston ring 10 and to introduce several of the spherical elements 7 into the bore 11 so that they can enter into the channel defined by the grooves 5 and 6 and distribute themselves around the circumference of the piston rod and piston, projecting into each of the grooves 5 and 6 and thus providing a connection between the piston 2 and piston rod 3. Thereupon the ring 10 is put in place in the groove 9 and the channel or bore 11 thereby closed. Conversely to separate the piston 2 from the piston rod 3, the ring 10 is removed and the spherical elements 7 are permitted to leave through the bore 11 whereupon the piston rod 3 can be withdrawn from the piston 2.

It will be understood that each of the elements described above, or two or more together, may also find a useful application in other types of constructions differing from the types described above.

While the invention has been illustrated and described as embodied in a cylinder and piston unit, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A cylinder and piston unit, comprising a cylinder bounded by an inner circumferential surface; a piston in said cylinder for guided movement therein and having an outer circumferential surface facing said inner surface; a piston rod; coupling means releasably coupling said piston rod with said piston, comprising at least one first peripheral groove in said piston and at least one second peripheral groove in said piston rod open to said first groove and defining with the same a peripheral channel; a plurality of spherical members accommodated in said channel and each partially projecting into the respective grooves; an outer circumferential recess provided in said outer surface; a radial bore in said piston dimensioned to permit passage of said spherical members, said bore having an outer end communicating with said recess and an inner open end communicating with said first groove; and a ring in said recess covering said outer open end and in sliding contact with said inner surface for guiding the movement of said piston in said cylinder.

2. A cylinder and piston unit as defined in claim 1, said piston having an axial passage bounded by an inner surface provided with said first groove, and said piston rod having an end portion accommodated in said passage and bounded by an outer surface provided with said second groove.

3. A cylinder and piston unit as defined in claim 1, wherein said ring consists at least predominantly of synthetic plastic material.

4. A cylinder and piston unit as defined in claim 1, wherein said ring consists of synthetic plastic material.

5. A cylinder and piston unit as defined in claim 1, wherein said ring has an axial slit and is composed of a material admitting of resilient radial expansion of said ring with concomitant widening of said slit.

* * * * *